United States Patent
Moriya

(10) Patent No.: US 11,381,714 B2
(45) Date of Patent: Jul. 5, 2022

(54) IMAGE PROCESSING DEVICE AND IMAGE PROCESSING SYSTEM

(71) Applicants: KABUSHIKI KAISHA TOSHIBA, Tokyo (JP); TOSHIBA ELECTRONIC DEVICES & STORAGE CORPORATION, Tokyo (JP)

(72) Inventor: Akira Moriya, Kanagawa (JP)

(73) Assignees: KABUSHIKI KAISHA TOSHIBA, Tokyo (JP); TOSHIBA ELECTRONIC DEVICES & STORAGE CORPORATION, Tokyo (JP)

( * ) Notice: Subject to any disclaimer, the term of this patent is extended or adjusted under 35 U.S.C. 154(b) by 0 days.

(21) Appl. No.: 17/191,029

(22) Filed: Mar. 3, 2021

(65) Prior Publication Data
US 2022/0094818 A1    Mar. 24, 2022

(30) Foreign Application Priority Data
Sep. 18, 2020    (JP) .............................. JP2020-157770

(51) Int. Cl.
*H04N 5/10*    (2006.01)
*H04N 5/073*    (2006.01)
*H04N 5/349*    (2011.01)

(52) U.S. Cl.
CPC .............. *H04N 5/10* (2013.01); *H04N 5/0736* (2013.01); *H04N 5/349* (2013.01)

(58) Field of Classification Search
CPC ......... H04N 5/10; H04N 5/0736; H04N 5/349
See application file for complete search history.

(56) References Cited

U.S. PATENT DOCUMENTS

| | | | | |
|---|---|---|---|---|
| 6,466,193 B1 * | 10/2002 | Anai | ........................ | G09G 5/14 345/204 |
| 7,511,760 B2 * | 3/2009 | Otomo | .................... | H04N 9/642 348/443 |

(Continued)

FOREIGN PATENT DOCUMENTS

| | | |
|---|---|---|
| JP | 2009-141456 A | 6/2009 |
| JP | 2017-046186 A | 3/2017 |
| WO | 2019/082628 A1 | 5/2019 |

*Primary Examiner* — Brian P Yenke
(74) *Attorney, Agent, or Firm* — Kim & Stewart LLP

(57) ABSTRACT

An image processing device includes an interface and a control circuit. The interface is configured to receive input line signals in synchronization with input horizontal synchronization signals, respectively. The control circuit is configured to store line image data contained in each of input line signals in the order of reception, generate internal horizontal synchronization signals, and output internal line signals containing the line image data in the input line signals, in synchronization with the internal horizontal synchronization signals, respectively. The input line signals include a first input line signal containing first line image data, and the internal line signals include a first internal line signal containing the first line image data. A horizontal cycle of the internal horizontal synchronization signal corresponding to the first internal line signal is less than a horizontal cycle of the input horizontal synchronization signal corresponding to the first input line signal.

20 Claims, 7 Drawing Sheets

(56) References Cited

U.S. PATENT DOCUMENTS

| | | | |
|---|---|---|---|
| 8,401,339 B1* | 3/2013 | Anderson | H04N 1/3876 |
| | | | 382/298 |
| 9,270,869 B1* | 2/2016 | Watanabe | G06T 1/60 |
| 10,051,158 B2* | 8/2018 | Kimura | H04N 5/0736 |
| 10,306,164 B2 | 5/2019 | Ajito | |
| 10,380,934 B2* | 8/2019 | Kim | G09G 3/2092 |
| 11,044,424 B2* | 6/2021 | Moriya | H04N 5/3456 |
| 11,134,179 B2* | 9/2021 | Jung | H04N 5/05 |
| 2006/0158441 A1* | 7/2006 | Lee | G06F 21/35 |
| | | | 345/204 |
| 2009/0167941 A1* | 7/2009 | Takeda | H04N 7/083 |
| | | | 348/E7.001 |
| 2013/0229404 A1* | 9/2013 | Ishida | G09G 3/36 |
| | | | 345/212 |
| 2014/0285681 A1* | 9/2014 | Kanou | H04N 5/77 |
| | | | 348/218.1 |
| 2017/0262231 A1* | 9/2017 | Koishi | G06F 3/0659 |
| 2019/0158798 A1* | 5/2019 | Miura | H04N 21/615 |
| 2021/0046870 A1 | 2/2021 | Maekawa | |

\* cited by examiner

IMAGE PROCESSING DEVICE AND IMAGE PROCESSING SYSTEM

CROSS-REFERENCE TO RELATED APPLICATION

This application is based upon and claims the benefit of priority from Japanese Patent Application No. 2020-157770, filed Sep. 18, 2020, the entire contents of which are incorporated herein by reference.

FIELD

Embodiments described herein relate generally to an image processing device and an image processing system.

BACKGROUND

An image processing device that reads line data from a plurality of digital cameras according to a horizontal cycle and processes an image is known.

When a processing speed of the image processing device that processes line data is faster than each horizontal cycle, the processing speed of the image processing device may decrease processing speed to match to the horizontal cycle.

DETAILED DESCRIPTION

Figure 1:
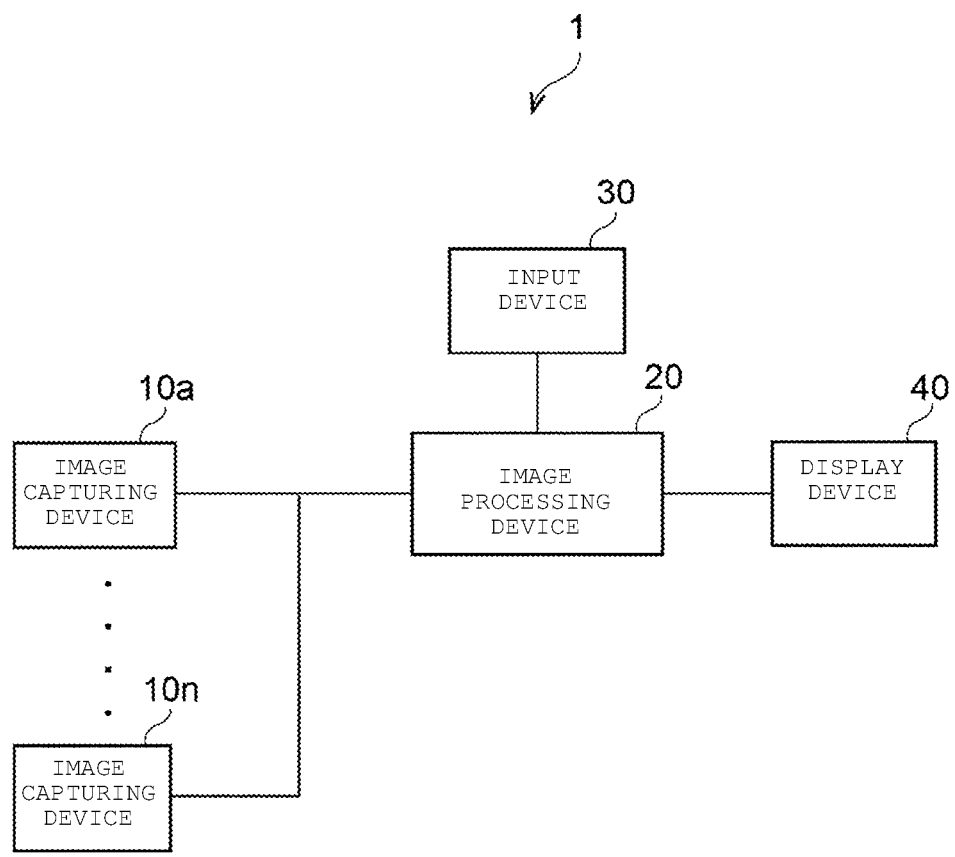
FIG. 1 is a block diagram of an image processing system according to an embodiment.

Embodiments provide an image processing device and an image processing method capable of higher-speed processing.

In general, according to an embodiment, an image processing device includes an input interface and an input control circuit. The input interface is configured to receive a sequence of input line signals in synchronization with input horizontal synchronization signals, respectively. Each of the input line signals contains line image data. The input control circuit includes an image input buffer configured to store the line image data contained in the sequence of input line signals in the order of reception by the input interface. The input control circuit is configured to generate internal horizontal synchronization signals and output internal line signals containing the line image data in the input line signals, in synchronization with the internal horizontal synchronization signals, respectively. The sequence of input line signals includes a first input line signal containing first line image data, and the internal line signals include a first internal line signal containing the first line image data. A horizontal cycle of the internal horizontal synchronization signal corresponding to the first internal line signal is less than a horizontal cycle of the input horizontal synchronization signal corresponding to the first input line signal.

Hereinafter, an image processing device, an image processing method, and an image processing system according to certain example embodiments of the present disclosure will be described with reference to the drawings. The embodiments described below are examples, and the present disclosure is not limited to these embodiments. Further, in the drawings, the same parts or parts having substantially similar functions are designated by the same reference numerals, and the repeated description thereof may be omitted. Dimensional ratios in the drawings may differ from actual ratios for convenience of explanation, and a part of the configuration may be omitted from drawings.

First Embodiment

FIG. 1 is a block diagram showing a configuration of an image processing system 1 according to a first embodiment. As shown in FIG. 1, the image processing system 1 according to the first embodiment is a system capable executing line-by-line image processing, and includes a plurality of image capturing devices 10a to 10n, an image processing device 20, an input device 30, and a display device 40.

Each of the image capturing devices 10a to 10n outputs image data obtained by A/D (analog-to-digital) converting a signal in accordance with incident light. In this image data, for example, one pixel comprises data for each of red (R), green (G), and blue (B).

In addition, each of the image capturing devices 10a to 10n has, for example, a camera interface, and generates a plurality of control signals Vsync, Hsync, Data Enable1, Data Enable2, Data ID, and image data RAW Data. In the present description, a vertical synchronization signal is indicated as "Vsync," a horizontal synchronization signal is indicated as "Hsync," a vertical effective signal is indicated as "Data Enable1," a horizontal effective signal is indicated as "Data Enable2," and line data that is image data is indicated as "RAW Data."

The control signal Vs (Vsync) is a vertical synchronization signal, and indicates start of data transfer in the vertical direction, that is, start of transfer of image data for one frame. The control signal Hs (Hsync) is a horizontal synchronization signal, and indicates start of data transfer in the horizontal direction, that is, start of transfer of image data for one line (or one block). The control signal DE1 (Data Enable1) is a vertically effective signal. It shows that the data to be transferred in the vertical direction, that is, the image data for one frame is effective. The control signal DE2 (Data Enable2) is a horizontally effective signal, and indicates that the data to be transferred in the horizontal direction, that is, the line data RD (RAW Data) for one line (one block) is effective. The image ID (Data ID) is a unique number allocated to the image data. The line data RD is image data for one line (one block) included in a first line signal, which may be referred to as an input line signal. A common image ID is allocated to the line data RD generated from the same image data. The first line signal may be generated such that the vertical synchronization signal Vs, the horizontal synchronization signal Hs, the vertical effective signal DE1, the horizontal effective signal DE2, and the image ID are included in a head portion of the first line signal.

Further, the number of pixels of imaging elements of the image capturing devices 10a to 10n may be different from each other. Therefore, a size of the line data RD may be different for each of the image capturing devices 10a to 10n.

The image processing device 20 is, for example, an image processing circuit image signal processor (ISP). The image processing device 20 can process the line data RD supplied from the image capturing devices 10a to 10n in parallel. That is, the image processing device 20 is configured such that an output throughput per hour is M times (M is, for example, 2 or more, but is not limited to this) or more an image input. Further, the image processing device 20 has, for example, a camera interface, and can generate the vertical synchronization signal Vs, the horizontal synchronization signal Hs, the vertical effective signal DE1, the horizontal effective signal DE2, the image ID, RGB image data, YUV image data, or the like. In the present embodiment, the output throughput being M times the image input means that one line data RD can be processed at a processing speed of M times the horizontal cycle including one line data RD. In other words, the output throughput being M times the image input means that for example, when the image capturing devices 10a to 10n take a time Readt to read one line data RD, the image processing device 20 can set a processing time from the input to the output of one line data RD to a time Readt/M. Further, the horizontal cycle means a period from start timing of the horizontal synchronization signal to start timing of a next horizontal synchronization signal in the same image data.

The input device 30 sets a processing parameter (Pr) for each image ID of the image data supplied from the image capturing devices 10a to 10n and the repeat count Rn, for example, by an operation of an operator. When the repeat count Rn is 2 or more, the processing parameter Pr corresponding to the repeat count Rn is set.

The display device 40 is, for example, a monitor, and can display an image based on the data supplied from the image processing device 20.

Figure 2:
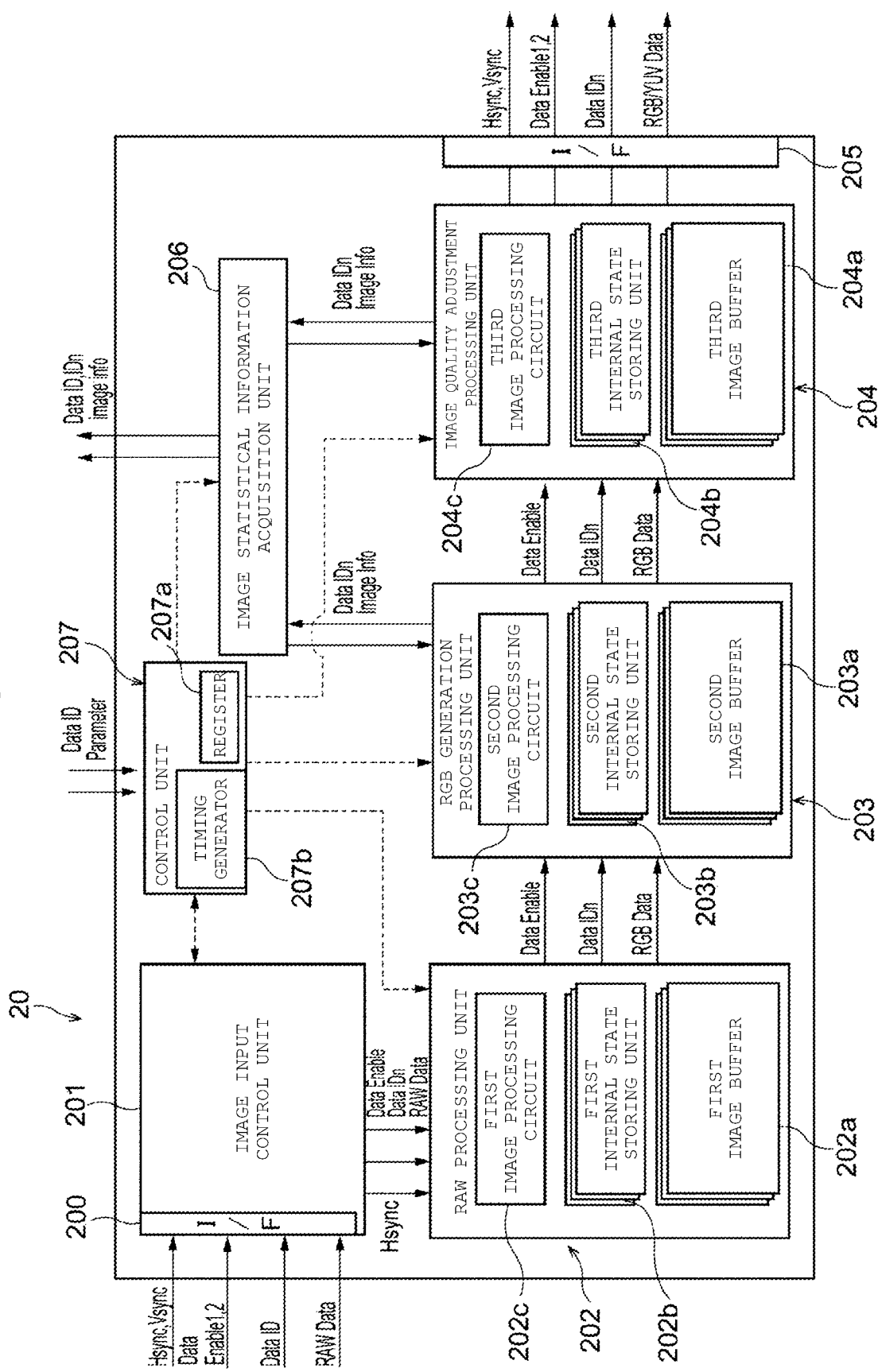
FIG. 2 is a block diagram of an image processing device.

FIG. 2 is a block diagram showing a configuration of the image processing device 20. The image processing device 20 includes an input interface 200, an image input control unit 201, a plurality of image processing units 202 to 204, an output interface 205, an image statistical information acquisition unit 206, and a control unit 207. The image processing device 20 performs, for example, pipeline processing for each pixel on the line data included in a second line signal which is input. The second line signal may be referred to as an internal line signal.

The input interface 200 is a data receiving side for the image capturing devices 10a to 10n. That is, the input interface 200 performs a reception operation in synchronization with the vertical synchronization signal Vs and the horizontal synchronization signal Hs, and receives the line data RD during a period in which the vertical effective signal DE1 and the horizontal effective signal DE2 are active.

The image input control unit 201 can change the horizontal cycle of the first line signal. Further, the image input control unit 201 can generate a new horizontal synchronization signal Hs and associate an internal image IDn described below with the processing parameter Pr. Additional aspects of the image input control unit 201 will be described below. The image input control unit 201 may be referred to as an input control circuit.

The first image processing unit 202 is, for example, a RAW processing unit, and performs, for example, white balance processing. The first image processing unit 202 includes N first image buffers 202a, N first internal state storing units 202b, and a first image processing circuit 202c. N is, for example, the largest integer equal to or less than M described above.

The N first image buffers 202a are, for example, line buffers. Each of the N first image buffers 202a can store a line signal of internal image IDn different from each other. The internal image IDn is a unique number newly issued, for example, in correspondence with the ID in the image input control unit 201 described below.

The N first internal state storing units 202b correspond to the N first image buffers 202a. For example, the N first internal state storing units 202b store information indicating which image ID corresponds to line data RD of which line in the vertical direction as an index.

The first image processing circuit 202c sequentially processes the line data RD stored in the N first image buffers 202a. At this time, the first image processing circuit 202c may perform processing by using the processing parameter Pr associated with the new horizontal synchronization signal Hs. Alternatively, the processing may be performed by using the processing parameter Pr stored in the control unit 207 which is described later. Then, the line data RD stored in the N first image buffers 202a are sequentially processed and supplied to the corresponding N second image buffers 203a. At this time, the N first internal state storing units 202b are updated according to the processing of the first image processing unit 202.

In the white balance processing in the first image processing circuit 202c, the RGB data of each pixel configuring the line data RD is plotted in a predetermined color space such as an xy color space, and R, G, and B of the data plotted near a blackbody radiation locus, which are likely to be a light source color, are integrated on the color space. Then, white balance coefficients G/R and G/B of the R component and the B component are obtained from the integrated value. The white balance processing is performed by using a white balance coefficient generated by the processing which is described above. Further, in the first image processing circuit 202c, a color image having R, G, and B color information is generated in all pixels by performing scratch processing, noise reduction processing, processing for interpolating a color mosaic image, and the like.

The second image processing unit 203 is, for example, an RGB generation processing unit, and performs, for example, matrix conversion processing and the like. The second image processing unit 203 has N second image buffers 203a, N second internal state storing units 203b, and a second image processing circuit 203c.

The N second image buffers 203a are, for example, line buffers. Each of the N second image buffers 203a can store line signals of the internal image IDsn different from each other. The N second internal state storing units 203b correspond to the N second image buffers 203a. For example, the N second internal state storing units 203b store information indicating which image ID corresponds to line data RD of which line in the vertical direction as the index.

The second image processing circuit 203c sequentially processes the line data RD stored in the N second image buffers 203a. At this time, the second image processing circuit 203c may perform processing by using the processing parameter Pr associated with the new horizontal synchronization signal Hs. Alternatively, the processing may be performed by using the processing parameter Pr stored in the control unit 207 which is described below. Then, the line data RD stored in the N second image buffers 203a are sequentially processed and supplied to the corresponding N third image buffers 204a. At this time, the N second internal state storing units 203b are updated according to the processing of the second image processing unit 203.

In the RGB generation processing in the second image processing circuit 203c, for example, matrix conversion processing, gamma conversion processing, and the like are performed. As a result, a color image is generated.

The third image processing unit 204 is, for example, an image quality adjustment processing unit, and performs image quality adjustment processing. Further, the third image processing unit 204 may convert the line data RD of the three primary colors (RGB) into image data formed of luminance information (Y) and color information (Cb and Cr). Alternatively, the line data RD of the three primary colors (RGB) may be converted into image data of a YUV format.

The third image processing unit 204 has N third image buffers 204a, N third internal state storing units 204b, and a third image processing circuit 204c.

The N third image buffers 204a are, for example, line buffers. Each of the N third image buffers 204a can store line data of the internal image IDsn different from each other. The N third internal state storing units 204b correspond to the N third image buffers 204a. For example, the N third internal state storing units 204b store information indicating which image ID corresponds to line data RD of which line in the vertical direction as the index.

The third image processing circuit 204c sequentially processes the line data RD stored in the N third image buffers 204a. At this time, the third image processing circuit 204c may perform processing by using the processing parameter Pr associated with the new horizontal synchronization signal Hs. Alternatively, the processing may be performed by using the processing parameter Pr stored in the control unit 207. Then, the line data RD stored in the N third image buffers 204a are sequentially processed and supplied to the output interface 205. At this time, the N second internal state storing units 203b are updated according to the processing of the second image processing unit 203.

In image quality adjustment processing in the third image processing circuit 204c, for example, contrast adjustment processing, gamma correction processing, and the like are performed. As a result, a color image is generated.

The output interface 205 has a camera interface, and generates the vertical synchronization signal Vs, the horizontal synchronization signal Hs, the vertical effective signal DE1, the horizontal effective signal DE2, the image ID, the processed image data RGB Data, or processed image data YUV Data with respect to the data supplied from the third image processing circuit 204c.

The image statistical information acquisition unit 206 outputs a processing content (Image and Info) including the image ID, the internal image IDn, and the processing parameter Pr of the data output to the output interface 205.

The control unit 207 controls the entire image processing device 20. The control unit 207 has a register 207a and a timing generator 207b. The register 207a records the repeat count Rn for each image ID input via the input device 30 and the processing parameter Pr corresponding to each repeat count Rn.

The timing generator 207b has a reference clock and generates a signal for timing control of the entire image processing device 20. The control unit 207 controls the timing of the entire image processing device 20 according to the reference clock.

Figure 3:
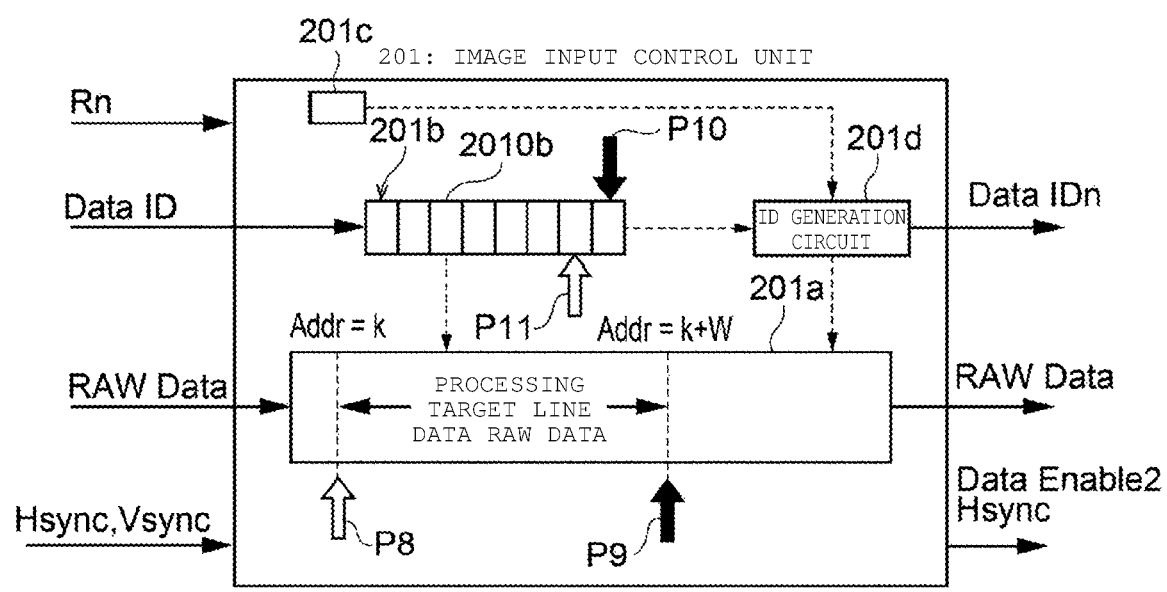
FIG. 3 is a block diagram of an image input control unit.

FIG. 3 is a block diagram showing a configuration example of the image input control unit 201. As shown in FIG. 3, the image input control unit 201 has an image input buffer 201a, an image ID memory unit 201b, a repeat counter 201c, and an ID generation circuit 201d.

The image input buffer 201a stores the line data RD during a period in which the horizontal effective signal DE2 is active in the order of reception. For that reason, the image IDs of the line data RD stored in the image input buffer 201a may be in arbitrary order.

The image input buffer 201a has an image buffer read pointer P8 and an image buffer write pointer P9. The image input buffer 201a reads the line data RD of the address range indicated by the image buffer write pointer P9 from the address indicated by the image buffer read pointer P8 according to the timing control of the control unit 207.

The image ID memory unit 201b is, for example, a first-in first-out (FIFO) buffer. The image ID memory unit 201b has a buffer 2010b, a write pointer P10, and a read pointer P11. The write pointer P10 indicates a write position in the buffer 2010b. The read pointer P11 indicates a read position in the buffer 2010b.

More specifically, at the write position in the buffer 2010b indicated by the write pointer P10, a read head address k of the line data RD, a read terminal address k+W based on the data amount W of the line data RD, which are stored in the image input buffer 201a, and the image ID are stored.

The read head address k of the line data RD and the read terminal address k+W based on the data amount W of the line data RD which are stored at the read position in the buffer 2010b indicated by the read pointer P11, and the image ID are read according to the timing control of the control unit 207, and supplied to the image input buffer 201a. A processing load of the image processing device 20 according to a read interval of the line data RD output from the image input buffer 201a. For example, as the read interval of the line data RD becomes shorter, the processing load of the image processing device 20 increases. Therefore, the processing load of the image processing device 20 can be adjusted by an interval of the line data RD read according to the timing control signal of the control unit 207 based on a processing capacity of the image processing device 20.

The image buffer read pointer P8 of the image input buffer 201a indicates the read head address k, and the image buffer write pointer P9 indicates the read terminal address k+W+1. Then, the line data RD in the address range indicated by the address indicated by the image buffer write pointer P9 is read from the address indicated by the image buffer read pointer P8. At this time, the position indicated by the image buffer read pointer P8 moves from the head address k to the terminal address k+W+1, and the data at the position indicated by the image buffer read pointer P8 is sequentially read.

The repeat counter 201c sets the repeat count Rn for each image ID recorded in the register 207a. Then, when the repeat count Rn is 2 or more, the image input buffer 201a repeatedly reads, in accordance with the repeat count, the line data RD of the address range indicated by the address indicated by the image buffer write pointer P9 from the address indicated by the image buffer read pointer P8 according to the repeat count Rn. For example, when the repeat count Rn is 3, the line data RD in the address range indicated by the address indicated by the image buffer write pointer P9 is read three times from the address indicated by the image buffer read pointer P8.

The repeat counter 201c increments the value of the internal counter according to number of readings. For example, in the repeat counter 201c, the value of the internal counter is set to 0 in the initial state, the value of the counter is changed to 1 when the data of the first repeat count is read, the value of the counter is changed to 2 when the data of the second repeat count is read, and the value of the counter is changed to 3 when the data of the third repeat count is read. The repeat counter 201c returns the value of the internal counter to 0, which is the initial value, when the value of the internal counter and the repeat count Rn match.

The ID generation circuit 201d generates an internal image IDn which is a unique number. The ID generation circuit 201d generates the internal image IDn based on, for example, the image ID of the line data RD and a numerical value of the repeat counter 201c. The ID generation circuit 201d generates a unique internal image IDn by, for example, combining the ID of each input image with the internal counter Num which is the repeat count. The internal image IDn according to the present embodiment corresponds to a unique identification number assigned to each line data.

The image input control unit 201 assigns the horizontal synchronization signal Hs, the internal image IDn, and the processing parameter Pr for the internal image IDn to the head portion of the second line signal. Alternatively, when the control unit 207 performs control by using the processing parameter Pr recorded in the register 207a, the second line signal may be configured without the horizontal synchronization signal Hs, the internal image IDn, and the processing parameter Pr for the internal image IDn.

First, a processing example of the image input control unit 201 when the repeat count is 3 will be described with reference to FIGS. 4A to 4C. Here, an example will be described in which the output throughput of the image processing device 20 per unit period is three times the image input. Further, the image input control unit 201 represents a case where the horizontal synchronization signal Hs, the internal image IDn, and the processing parameter Pr for the internal image IDn are assigned to the head portion of the second line signal.

Figure 4A:
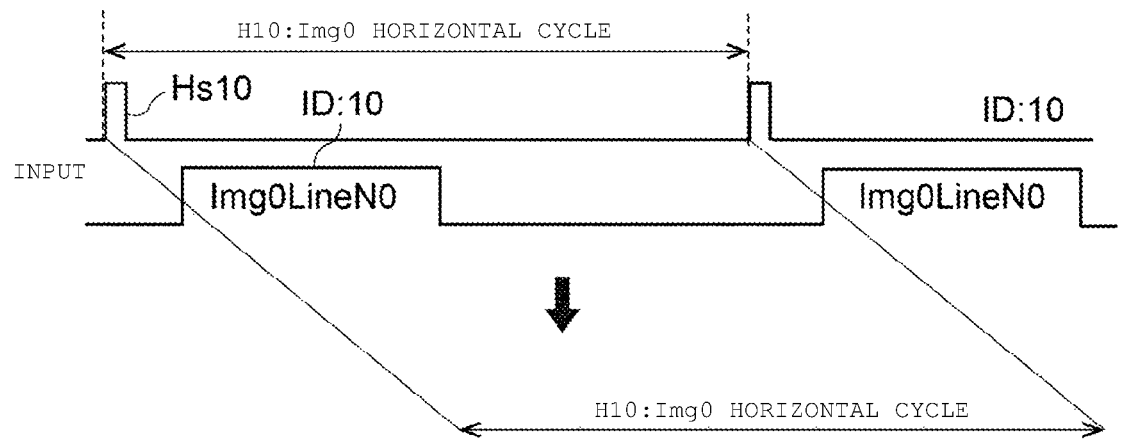
FIGS. 4A to 4C are schematic diagrams depicting a processing example of an image input control unit when a repeat count is 3.
Figure 4B:
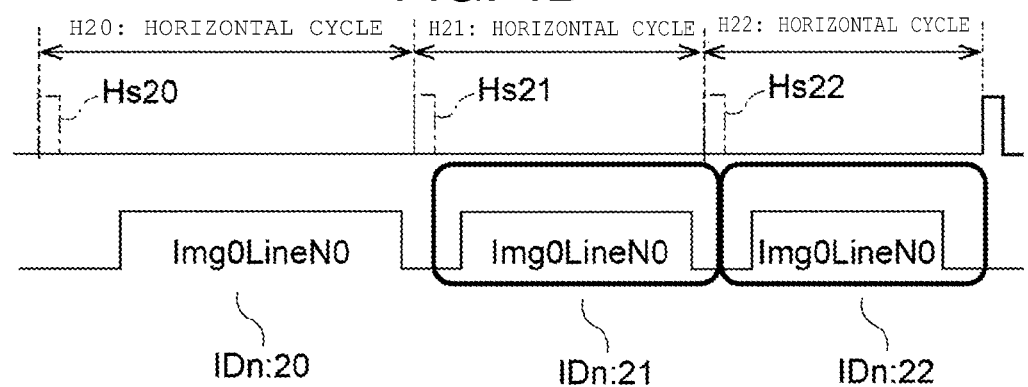
Figure 4C:
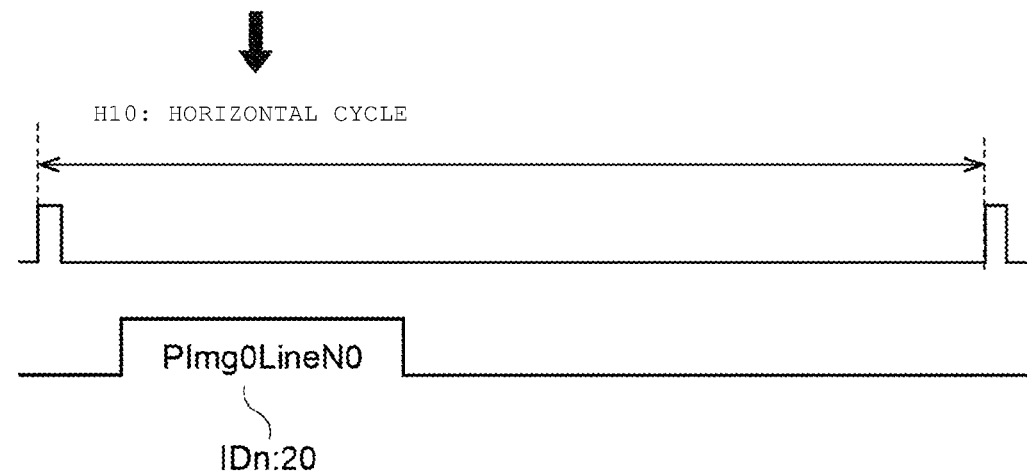

FIGS. 4A to 4C are schematic diagrams showing a processing example of the image input control unit 201 when the repeat count is 3.

FIG. 4A is a diagram schematically showing the first line signal of the image ID 10 input to the input interface 200. A horizontal axis shows time. Line data Imag0LineN0 is included in the horizontal cycle H10 based on the horizontal synchronization signal Hs10.

In the image processing device 20 that performs pipeline processing, the first line signal is read and image-processed according to the horizontal cycle, which is a length between the horizontal synchronization signals Hs of the first line signal. As the horizontal cycle becomes longer, the processing time of the image processing becomes longer. As can be seen from these, as shown in FIG. 4A, if the line data Imag0LineN0 included in the horizontal cycle is a part of the horizontal cycle H10, a loss occurs in the processing time of the image processing device 20. For example, in the reading method of the related art, the line data Imag0LineN0 is input according to the time of the horizontal synchronization signal Hs10. In order to process the line data Imag0LineN0 three times, it takes three times the horizontal synchronization signal Hs10. An upper horizontal cycle H10 indicates the horizontal cycle when being input to the image processing device 20, and a lower horizontal cycle H10 corresponds to a signal when being output from the image input buffer 201a.

FIG. 4B is a diagram schematically showing a second line signal output from the image input buffer 201a. For example, the line data Imag0LineN0 is included in the horizontal cycles H20, H21, and H22 each of which roughly amounts to one third of the horizontal cycle H10. The lower horizontal cycle H10 in FIG. 4A corresponds to a combined length of the horizontal cycles H20, H21, and H22 in FIG. 4B. That is, in FIG. 4B, the time width is depicted as being enlarged from that in FIG. 4A. As described above, the second line signal output from the image input buffer 201a is output with a delay from the upper horizontal cycle H10. Further, for example, since the horizontal cycle H20 is reduced to about one-third, the processing time for the line data Imag0LineN0 of the image processing device 20 is reduced to about one-third.

FIG. 4C is a diagram schematically showing a line signal output from the output interface 205. The line data Pimag0LineN0 shows the line data Pimag0LineN0 after the processing of the internal image IDn 20.

As shown in FIG. 4A, the line data Imag0LineN0 is received by the input interface 200 based on the horizontal synchronization signal Hs10. The horizontal effective signal DE2 at this time is active, and the repeat count Rn=3 is recorded in the register 207a of the control unit 207 in correspondence with the image ID 10.

Since the horizontal effective signal DE2 is active, the image input buffer 201a stores the line data Imag0LineN0. At this time, the image ID memory unit 201b stores the image ID 10, the read head address k of the line data Imag0LineN0 written in the image input buffer 201a, the terminal address k+W, and the image ID at the write position indicated by the write pointer P10. Further, the internal counter Num of the repeat counter 201c has an initial value of 0, and the repeat count Rn=3 is set in the repeat counter 201c via the control unit 207.

At this time, the ID generation circuit 201d generates the internal image IDn as, for example, 20 based on the image ID=10 and the numerical value 0 of the repeat counter 201c.

The image input buffer 201a reads the line data RD of the address range indicated by the address indicated by the image buffer write pointer P9 from the address indicated by the image buffer read pointer P8. At this time, the image input control unit 201 outputs the horizontal effective signal DE2 indicating active to the first image processing unit 202.

The image input control unit 201 assigns the horizontal synchronization signal Hs20, the internal image IDn, and the processing parameter Pr for the internal image IDn to the head portion, and generates the second line signal including the line data RD. The processing parameter Pr is supplied from the register 207a of the control unit 207. In addition, information indicating that the line N0 is recorded is recorded in the first internal state storing unit 202b corresponding to the recorded first image buffer 202a.

Furthermore, the ID generation circuit 201d associates the internal image IDn 10 with the first line data Imag0LineN0 recorded in the first image buffer 202a. Then, the repeat counter 201c increments the internal counter Num and changes it from 0 to 1.

In the repeat counter 201c, since the internal counter Num=1 and the repeat count Rn=3 do not match, the image input buffer 201a reads the line data RD of the same address range as that of the previous time. At this time, the position indicated by the image buffer read pointer P8 is returned to the read head address k of Imag0LineN0. Further, the horizontal effective signal DE2 indicating active is output to the first image processing unit 202. Furthermore, information indicating the line N0 is recorded in the first internal state storing unit 202b corresponding to the recorded first image buffer 202a.

At this time, the ID generation circuit 201d generates the internal image IDn as, for example, 21 based on the ID=10 and the numerical value 1 of the repeat counter 201c.

Furthermore, the ID generation circuit 201d associates the internal image IDn 21 with the second line data Imag0LineN0 recorded in the first image buffer 202a. Then, the repeat counter 201c increments the internal counter Num and changes it from 1 to 2.

In the repeat counter 201c, since the internal counter Num=2 and the repeat count Rn=3 do not match, the image input buffer 201a reads again the line data RD of the same address range. At this time, the horizontal effective signal DE2 indicating active is output to the first image processing unit 202. In addition, information indicating that the line N0 is recorded is recorded in the first internal state storing unit 202b corresponding to the recorded first image buffer 202a.

At this time, the ID generation circuit 201d generates the internal image IDn as, for example, 22, based on the image ID=10 and the numerical value 2 of the repeat counter 201c.

Furthermore, the ID generation circuit 201d associates the internal image IDn 22 with the third line data Imag0LineN0 recorded in the first image buffer 202a. Then, the repeat counter 201c increments the internal counter Num and changes it from 2 to 3.

Next, since the internal counter Num=3 and the repeat count Rn=3 match, the repeat counter 201c returns the internal counter Num to 0. At this time, since the internal counter Num=3 and the repeat count Rn=3 match, the image input buffer 201a stops the repeat reading. Then, the position indicated by the image buffer read pointer P8 is moved to the read head address kn of the next line data RD.

As described above, the line data Imag0LineN0 is stored in each of the three first image buffers 202a, and the line data Imag0LineN0 is sequentially processed by the image processing units 202 to 204 by using different processing parameters Pr.

Then, when the processing is completed, as shown in FIG. 4C, the output interface 205 outputs the line data Pimag0LineN0 after each processing of the internal image IDsn 20 to 22 as a signal of the original horizontal cycle H10. The horizontal cycle H10 of the processed line data Pimag0LineN0 can be returned to the original length. Alternatively, the output interface 205 may output the horizontal cycle by being changed as in the horizontal cycles H20, H21, and H22.

The image input control unit 201 repeatedly reads the line data Imag0LineN0 during a time period equal to the first horizontal cycle H10. As a result, the image processing device 20 can shorten the processing time for three instances of the line data Imag0LineN0 and triple the throughput, for example. That is, by shortening the period for excluding the line data Imag0LineN0 of the horizontal cycle H10, the processing time for the line data Imag0LineN0 of the image processing device 20 is further shortened. In other words, by changing the horizontal cycle of the first line signal including the line data Imag0LineN0 and performing the repeat processing, the processing time can be shortened according to the processing speed of the image processing device 20.

Further, the image input buffer 201a repeatedly reads the same address range corresponding to one line data based on the repeat count Rn. The image input buffer 201a stores the line data of the same address range in each of the plurality of first image buffers 202a of the first image processing unit 202, and the first image processing unit 202 sequentially performs different processing on the line data stored in each of the plurality of line buffers. When different image processing is performed on one line data, different image processing can be performed without reading the line data a plurality of times, and the processing speed can be further increased.

Next, a processing example of the image input control unit 201 when the first line signals of different image IDs are sequentially input to the image processing device 20 in which different image IDs are sequentially input will be described with reference to FIGS. 5A to 5D. Here, an example in which the output throughput of the image processing device 20 per hour is three times the image input will be described.

FIGS. 5A to 5D are schematic diagrams showing a processing example of the image input control unit 201 when first line signals having different image IDs are sequentially input.

Figure 5A:
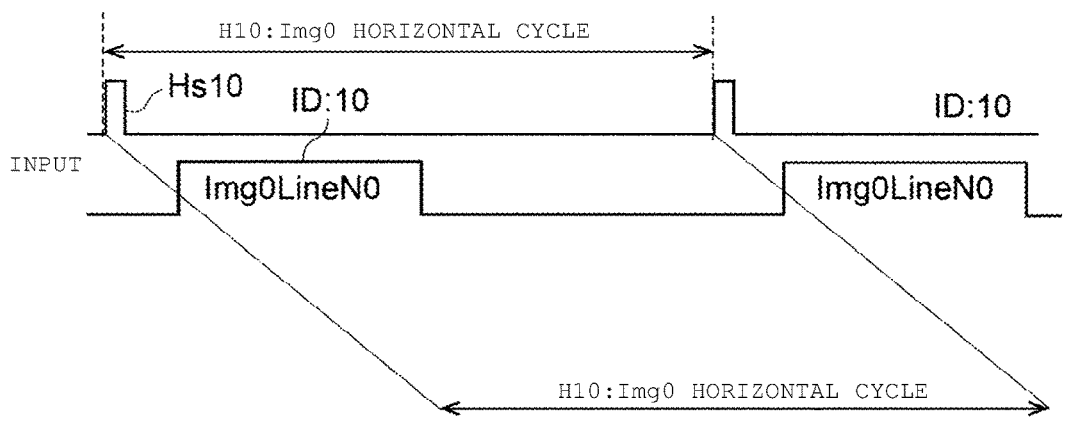
FIGS. 5A to 5D are schematic diagrams depicting a processing example of an image input control unit when first line signals having different image IDs are sequentially input.

FIG. 5A is a diagram schematically showing a first line signal of the image ID 10 input to the input interface 200. A horizontal axis shows time. Line data Imag0LineN0 is included in the first line signal.

Figure 5B:
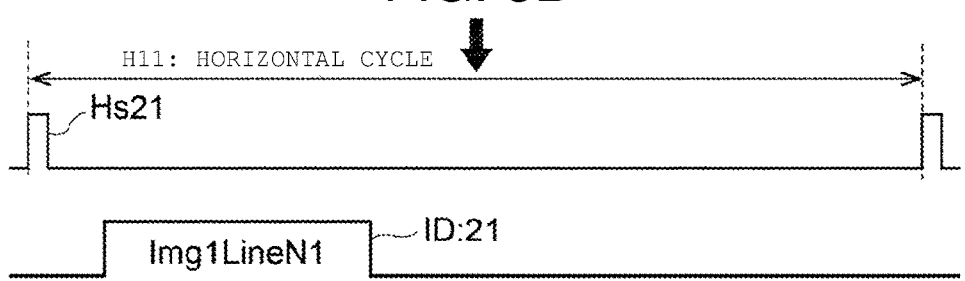

FIG. 5B is a diagram schematically showing a first line signal of the image ID 21 input to the input interface 200. A horizontal axis shows time. Line data Imag1LineN1 is included in the first line signal.

Figure 5C:
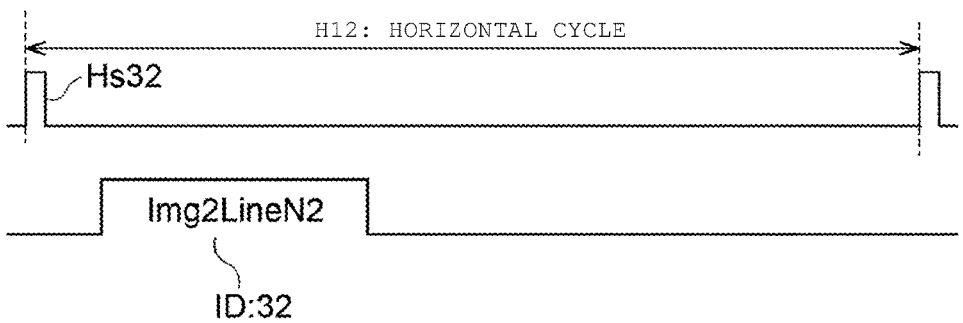

FIG. 5C is a diagram schematically showing a first line signal of the image ID 32 input to the input interface 200. A horizontal axis shows time. Line data Imag2LineN2 is included in the first line signal.

Figure 5D:
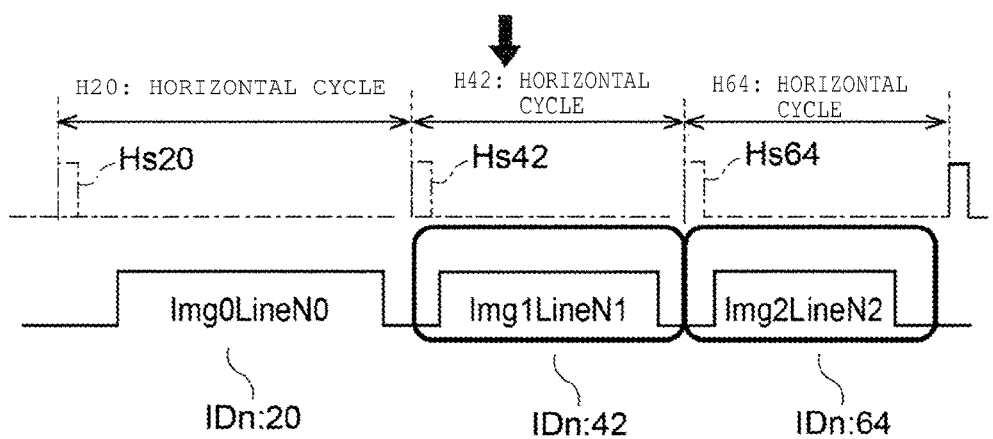

FIG. 5D is a diagram schematically showing a second line signal output from the image input buffer 201a. For example, the line data Imag0LineN0, Imag1LineN1, and Imag2LineN2 are respectively included in the horizontal cycles H20, H42, and H64, each of which is one-third of the horizontal cycles H10, H11, and H12. A combined length of the horizontal cycles H10, H11, and H12 corresponds to the horizontal cycle H10 in a lower portion of FIG. 5A.

As shown in FIGS. 5A, 5B, and 5C, the first line signals including line data Imag0LineN0, Imag1LineN1, and Imag2LineN2 are sequentially received into the input interface 200 based on the horizontal synchronization signals Hs10, Hs21, and Hs32. The horizontal effective signal DE2 at this time is active, and the repeat count Rn=1 and the processing parameter Pr are recorded in the register 207a in correspondence with the image ID 10, ID 21, and ID 32.

As described above, the processing time required for the output of the image processing device 20 with respect to the line data Imag0LineN0 is about 1/N of the horizontal cycle H10 corresponding to the time required for the camera input. Here, for example, the processing time is about one-third. If the line data Imag0LineN0, Imag1LineN1, and Imag2LineN2 are sequentially processed according to each of the horizontal cycles Hs10, Hs11, and Hs12 as in the related art, in order to process the Imag0LineN0, Imag1LineN1, and Imag2LineN2, it takes time of the horizontal cycle Hs10+Hs11+Hs12.

Since each horizontal effective signal DE2 is active, the image input buffer 201a sequentially stores the line data Imag0LineN0, Imag1LineN1, and Imag2LineN2. At this time, the image ID memory unit 201b stores the image ID 10, the read head address k of the line data Imag0LineN0 written in the buffer 2010a, and the read terminal address k+w+1 at a position designated by the write pointer P10.

Similarly, the image ID memory unit 201b stores the image ID 11, the read head address k1 of the line data Imag1LineN1, and the read terminal address k+w+1 at a position designated by the write pointer P10. Similarly, the image ID memory unit 201b stores the image ID 12, the read head address k2 of the line data Imag2LineN2, and the read terminal address k2+W2 at a position designated by the write pointer P10. In this case, since the image input buffer 201a instantly receives the first line signals of the horizontal cycles Hs10, Hs11, and Hs12, and the like, the time for the image input buffer 201*a* to store the line data Imag0LineN0, Imag1LineN1, and Imag2LineN2, and the like is shorter than each of the horizontal cycles Hs10, Hs11, and Hs12.

The image input buffer 201*a* reads the line data RD of the address range indicated by the address indicated by the image buffer write pointer P9 from the address indicated by the image buffer read pointer P8. As a result, the line data Imag0LineN0 is read. At this time, the image input control unit 201 assigns the horizontal synchronization signal Hs20, the internal image IDn=20, and the processing parameter Pr for the internal image IDn=20 to the head portion, and generates the second line signal including the Imag0LineN0.

Further, the horizontal effective signal DE2 indicating active is output to the first image processing unit 202. Furthermore, information indicating the line N0 is recorded in the first internal state storing unit 202*b* corresponding to the recorded first image buffer 202*a*. At this time, the ID generation circuit 201*d* generates the internal image IDn as, for example, 20 based on the image ID=10 and the numerical value 0 of the repeat counter 201*c*. Then, the repeat counter 201*c* increments the internal counter Num and changes it from 0 to 1. Next, the repeat counter 201*c* returns to the internal counter Num=0 because the internal counter Num=1 and the repeat count Rn=1 match.

Next, the image input buffer 201*a* reads the line data RD of the address range indicated by the address indicated by the image buffer write pointer P9 from the address indicated by the image buffer read pointer P8. As a result, the line data Imag1LineN1 is read. At this time, the image input control unit 201 assigns the horizontal synchronization signal Hs20, the internal image IDn=42, and processing parameter Pr for the internal image IDn=42 to the head portion, and generates the second line signal including the line data Imag1LineN1. At this time, the image input control unit 201 assigns the horizontal synchronization signal Hs42, the internal image IDn=42, and the processing parameter Pr for the internal image IDn=42 to the head portion of the second line signal, and generates the second line signal including the line data Imag1LineN1.

Further, the image input control unit 201 outputs the horizontal effective signal DE2 indicating active to the first image processing unit 202. Further, the image input control unit 201 records information indicating that the line is N1 in the first internal state storing unit 202*b* corresponding to the recorded first image buffer 202*a*. At this time, the ID generation circuit 201*d* generates the internal image IDn as 42, for example, based on the ID=21 and the numerical value 0 of the repeat counter 201*c*. Then, the repeat counter 201*c* increments the internal counter Num and changes it from 0 to 1. Next, the repeat counter 201*c* returns to the internal counter Num=0 because the internal counter Num=1 and the repeat count Rn=1 match.

Next, the image input buffer 201*a* reads the line data RD of the address range indicated by the address indicated by the image buffer write pointer P9 from the address indicated by the image buffer read pointer P8. As a result, the line data Imag2LineN2 is read. At this time, the image input control unit 201 assigns the horizontal synchronization signal Hs64, the internal image IDn=64, and the processing parameters Pr corresponding to the internal image IDn=64 to the head portion, and generates the second line signal including the line data Imag2LineN2.

The image input control unit 201 outputs the horizontal effective signal DE2 indicating active to the first image processing unit 202. Further, the image input control unit 201 records information indicating that the line is N2 in the first internal state storing unit 202*b* corresponding to the recorded first image buffer 202*a*.

At this time, the ID generation circuit 201*d* generates the internal image IDn as, for example, 64, based on the ID=32 and the numerical value 0 of the repeat counter 201*c*. Then, the repeat counter 201*c* increments the internal counter Num and changes it from 0 to 1. Next, the repeat counter 201*c* returns to the internal counter Num=0 because the internal counter Num=1 and the repeat count Rn=1 match.

As described above, the signals including the line data Imag0LineN0, Imag1LineN1, and Imag2LineN2 are stored in the three first image buffers 202*a*, respectively, and as described above, the line data Imag0LineN0, Image1LineN1, and Image2LineN2 are sequentially processed by the image processing units 202 to 204 by using different processing parameters Pr.

Then, when the processing is completed, the output interface 205 outputs the line data after each processing of IDn 20, 42, and 64 as a signal in synchronization with horizontal synchronization signals of the original horizontal cycle. Alternatively, the output interface 205 may output by changing the horizontal cycles such as the horizontal cycles H20, H42, and H64.

The image input control unit 201 reads the line data Imag0LineN0, Imag1LineN1, and Imag2LineN2 at predetermined time intervals during a time period equal to the first horizontal cycle H10. The image processing device 20 can shorten the processing time of the line data Imag0LineN0, Imag1LineN1, and Imag2LineN2, and can triple the throughput, for example. That is, by shortening the period for excluding the line data Imag0LineN0, Imag1LineN1, and Imag2LineN2 of the horizontal cycles H10, H11, and H12, the processing time for the line data Imag0LineN0, Imag1LineN1, and Imag2LineN2 of the image processing device 20 is further shortened. In other words, by changing and processing the horizontal cycle of the first line signal including the line data Imag0LineN0, the line data Imag1LineN1, and the line data Imag2LineN2, the processing time can be shortened according to the processing speed of the image processing device 20.

Next, a processing example of the image input control unit 201 when the first line signals having different image IDs are sequentially input and the repeat count of one of the first line signals is 2 will be described with reference to FIGS. 6A to 6C.

Figure 6A:
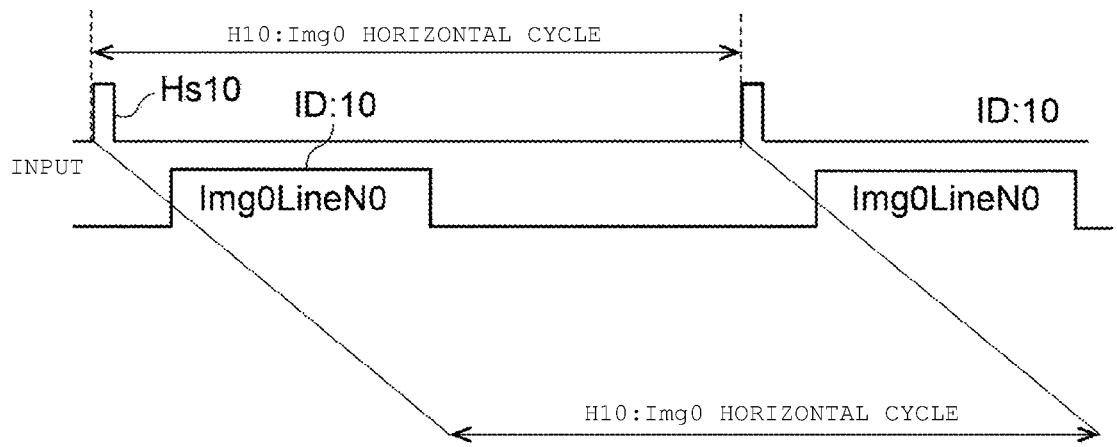
FIGS. 6A to 6C are schematic diagrams showing a processing example of an image input control unit when a repeat count of one of the first line signals is 2.
Figure 6B:
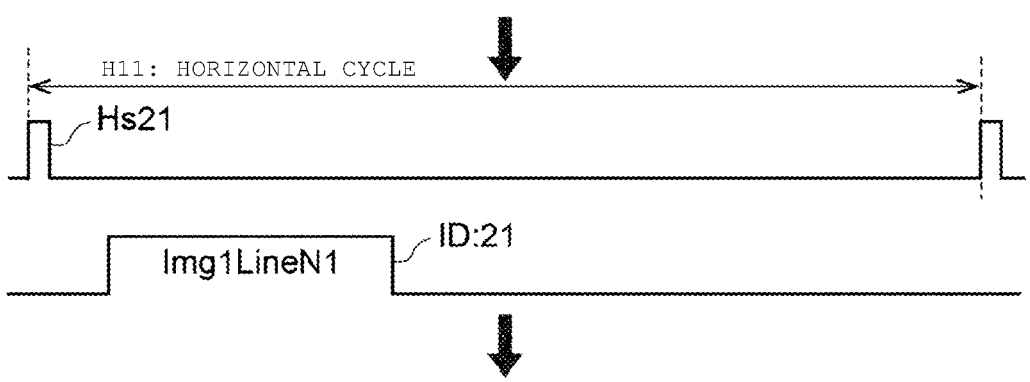
Figure 6C:
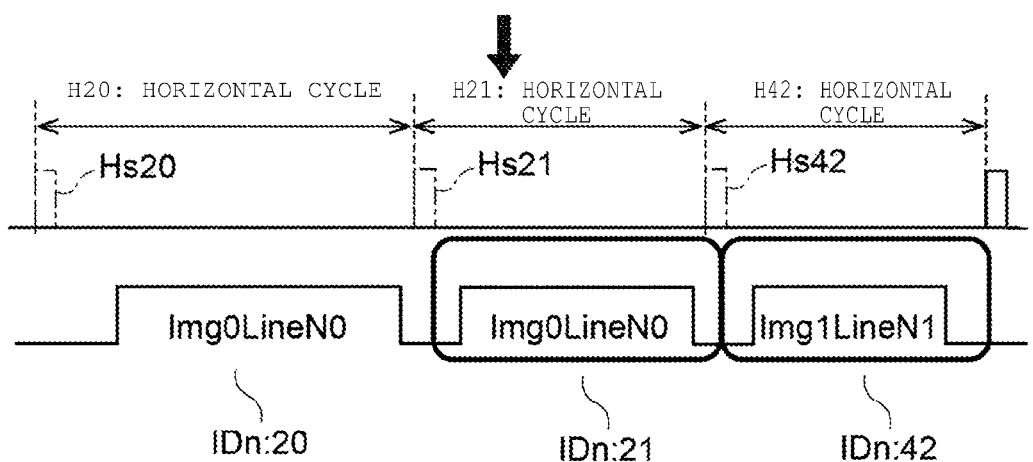

FIGS. 6A to 6C are schematic diagrams showing a processing example of the image input control unit 201 when the first line signals having different image IDs are sequentially input and the repeat count of one of the first line signals is 2.

FIG. 6A is a diagram schematically showing the first line signal of the image ID 10 input to the input interface 200. A horizontal axis shows time. Line data Imag0LineN0 is included in the first line signal.

FIG. 6B is a diagram schematically showing the first line signal of the image ID 21 input to the input interface 200. A horizontal axis shows time. Line data Imag1LineN1 is included in the first line signal.

FIG. 6C is a diagram schematically showing a second line signal output from the image input buffer 201*a*. For example, the line data Imag0LineN0 and Imag1LineN1 are respectively included in the horizontal cycles H20, H21, and H42 each of which is one-third of the horizontal cycles H10 and H11. A combined length of the horizontal cycles H20, H21, and H42 corresponds to the horizontal cycle H10 in a lower portion of FIG. 6A.

As shown in FIG. 6C, the image input control unit 201 processes the first line signal including the line data Imag0LineN0 with the repeat count Rn set to 2 by the same processing as in FIGS. 4A to 4C. Further, the image input control unit 201 processes the first line signal including the line data Imag1LineN1 with the repeat count Rn set to 1 by the same processing as in FIGS. 5A to 5D.

By such processing, signals including line data Imag0LineN0, Imag0LineN0, and Imag1LineN1 are stored in the three first image buffers 202a, respectively, and the line data Imag0LineN0, Imag0LineN0, and Imag1LineN1 are sequentially processed by the image processing units 202 to 204 in accordance with different processing parameters Pr as described above.

Then, when the processing is completed, the output interface 205 outputs the line data after each processing of IDn 20, 21, and 42 as the signal of the original horizontal cycle. Alternatively, the output interface 205 may output by changing the horizontal cycle as the horizontal cycles H20, H21, and H42.

By changing and processing the horizontal cycle of the first line signal including the line data Imag0LineN0 and the line data Imag1LineN1, the processing time can be shortened according to the processing speed of the image processing device 20.

According to the present embodiment, the image input buffer 201a sequentially stores the line data that is image data in the first line signal, and outputs the second line signal of a time range shorter than the horizontal cycle including and corresponding to the line data according to the timing control signal based on the processing capacity of the image processing device 20. Then, the first image processing unit 202 sequentially performs different processing on the line data included in the second line signal stored in each of the plurality of line buffers. Therefore, the first image processing unit 202 can read the line data in a time shorter than the horizontal cycle, and the processing speed of the line data can be made faster.

Modified Example 1

Modified Example 1 is different from the image processing system 1 according to an embodiment in that the input interface 200, the image input control unit 201, and the control unit 207 are separated from the image processing device 20 and configured as an image input control device 20a. The differences from the image processing system 1 will be primarily described.

Figure 7:
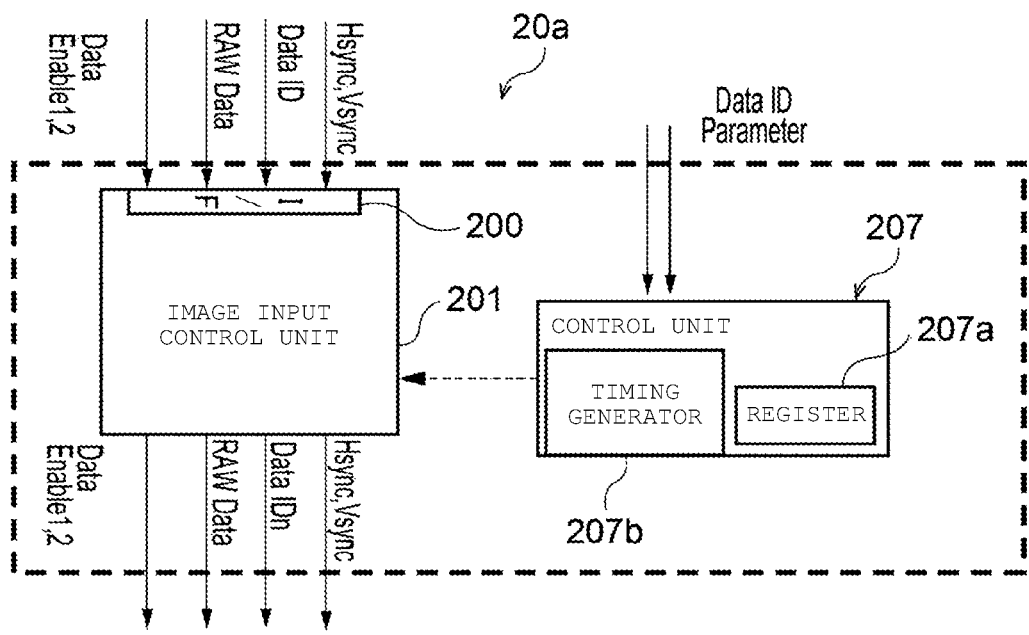
FIG. 7 is a block diagram of an image input control device.

FIG. 7 is a block diagram showing a configuration of the image input control device 20a. As shown in FIG. 7, the image input control device 20a includes the input interface 200, the image input control unit 201, and the control unit 207. The image input control device 20a can output the first line signal in which the length of the horizontal cycle of the input first line signal is changed, as in FIGS. 4A to 4C, 5A to 5D, and 6A to 6C described above. Moreover, the interval between the first line signals can also be changed. The length of the horizontal cycle of the second line signal on the network can be changed and supplied to, for example, another image processing device 20.

While certain embodiments have been described, these embodiments have been presented by way of example only, and are not intended to limit the scope of the disclosure. Indeed, the novel embodiments described herein may be embodied in a variety of other forms; furthermore, various omissions, substitutions and changes in the form of the embodiments described herein may be made without departing from the spirit of the disclosure. The accompanying claims and their equivalents are intended to cover such forms or modifications as would fall within the scope and spirit of the disclosure.

What is claimed is:

1. An image processing device, comprising:
an input interface configured to receive a sequence of input line signals in synchronization with input horizontal synchronization signals corresponding to the input line signals, respectively, each of the input line signals containing line image data; and
an input control circuit including an image input buffer configured to store the line image data contained in the sequence of input line signals in the order of reception by the input interface, the input control circuit configured to generate internal horizontal synchronization signals and output internal line signals containing the line image data in the input line signals, in synchronization with the internal horizontal synchronization signals, respectively, wherein
the sequence of input line signals includes a first input line signal containing first line image data,
the internal line signals include a sequence of first internal line signals each of which contains the first line image data,
each of horizontal cycles of the internal horizontal synchronization signals corresponding to the sequence of first internal line signals is less than a horizontal cycle of the input horizontal synchronization signal corresponding to the first input line signal.

2. The image processing device according to claim 1, wherein
a length of the first input line signal is less than the horizontal cycle of the input horizontal synchronization signal corresponding thereto, and
a length of each of the first internal line signals is less than the horizontal cycle of the internal horizontal synchronization signal corresponding thereto.

3. The image processing device according to claim 1, wherein
the input control circuit further includes a first counter, and
the input control circuit is configured to repeatedly read the first line image data from the image input buffer a predetermined number of times indicated by the first counter to generate the sequence of the first internal line signals.

4. The image processing device according to claim 3, wherein the input control circuit further includes:
a second counter configured to indicate a number of times the first line image data has been read from the image input buffer, and
an ID generation circuit configured to generate a unique ID corresponding to each of the sequence of first internal line signals by using the number indicated by the second counter.

5. The image processing device according to claim 4, wherein the input control circuit is configured stop reading the first line image data from the image input buffer upon the number indicated by the second counter reaching the predetermined number indicated by the first counter.

6. The image processing device according to claim 1, wherein
the sequence of input line signals includes a second input line signal that contains second line image data and immediately follows the first input line signal, the internal line signals include a second internal line signal that contains the second line image data and immediately follows the first internal line signals, and a horizontal synchronization cycle of the internal horizontal synchronization signal corresponding to the second internal line signal is less than a horizontal synchronization cycle of the input horizontal synchronization signal corresponding to the second input line signal.

7. The image processing device according to claim 1, wherein the input control circuit is configured to store an image ID corresponding to each of the received input line signals and an address range of the image input buffer in which the respective line image data is stored.

8. The image processing device according to claim 7, wherein the input control circuit is configured to sequentially read the stored address ranges corresponding to the input line signals and then sequentially read the address ranges of the image input buffer to generate the output internal line signals.

9. The image processing device according to claim 1, wherein the image processing device further comprises:
  a plurality of line buffers configured to store the first line image data contained in the sequence of the first internal line signals, respectively, the plurality of line buffers including first and second line buffers; and
  an image processing circuit configured to:
    perform a first image processing operation on the first line image data stored in the first line buffer, and
    perform a second image processing operation, but not the first image processing operation, on the first line image data stored in the second line buffer.

10. An image processing method, comprising:
receiving a sequence of input line signals in synchronization with input horizontal synchronization signals corresponding to the input line signals, respectively, each of the input line signals containing line image data;
storing, in an image input buffer, the line image data contained in the sequence of input line signals in the order of reception;
generating internal horizontal synchronization signals; and
outputting internal line signals containing the line image data in the input line signals, in synchronization with the internal horizontal synchronization signals, respectively, wherein
the sequence of input line signals includes a first input line signal containing first line image data,
the internal line signals include a sequence of first internal line signals each of which contains the first line image data, and
each of horizontal cycles of the internal horizontal synchronization signals corresponding to the sequence of first internal line signals is less than a horizontal cycle of the input horizontal synchronization signal corresponding to the first input line signal.

11. The image processing method according to claim 10, wherein a length of the first input line signal is less than the horizontal cycle of the input horizontal synchronization signal corresponding thereto, and a length of each of the first internal line signals is less than the horizontal cycle of the internal horizontal synchronization signal corresponding thereto.

12. The image processing method according to claim 10, further comprising:
repeatedly reading the first line image data from the image input buffer a predetermined number of times indicated by a first counter to generate the sequence of the first internal line signals.

13. The image processing method according to claim 12, further comprising:
generating a unique ID corresponding to each of the sequence of first internal line signals by using a number indicated by a second counter configured to indicate a number of times the first line image data has been read from the image input buffer.

14. The image processing method according to claim 13, further comprising:
stopping the reading of the first line image data from the image input buffer upon the number indicated by the second counter reaching the predetermined number indicated by the first counter.

15. The image processing method according to claim 10, wherein the sequence of input line signals includes a second input line signal that contains second line image data and immediately follows the first input line signal, the internal line signals include a second internal line signal that contains the second line image data and immediately follows the first internal line signals, and a horizontal synchronization cycle of the internal horizontal synchronization signal corresponding to the second internal line signal is less than a horizontal synchronization cycle of the input horizontal synchronization signal corresponding to the second input line signal.

16. The image processing method according to claim 10, further comprising:
storing an image ID corresponding to each of the received input line signal and an address range of the image input buffer in which the respective line image data is stored.

17. The image processing method according to claim 16, further comprising:
sequentially reading the stored address ranges corresponding to the input line signals, and then sequentially reading the address ranges of the image input buffer to generate the output internal line signals.

18. The image processing method according to claim 10, further comprising:
storing, in a plurality of line buffers, the first line image data contained in the sequence of the first internal line signals, respectively, the plurality of line buffers including first and second line buffers; and
performing a first image processing operation on the first line image data stored in the first line buffer and a second image processing operation, but not the first image processing operation, on the first line image data stored in the second line buffer.

19. An image processing device, comprising:
an input interface configured to receive a sequence of input line signals in synchronization with input horizontal synchronization signals corresponding to the input line signals, respectively, each of the input line signals containing line image data; and
an input control circuit including an image input buffer configured to store the line image data contained in the sequence of input line signals in the order of reception by the input interface, the input control circuit configured to generate internal horizontal synchronization signals and output internal line signals containing the line image data in the input line signals, in synchronization with the internal horizontal synchronization signals, respectively, wherein the sequence of input line signals includes a first input line signal containing first line image data, the internal line signals include a first internal line signal containing the first line image data, a horizontal cycle of the internal horizontal synchronization signal corresponding to the first internal line signal is less than a horizontal cycle of the input horizontal synchronization signal corresponding to the first input line signal, a length of the first input line signal is less than the horizontal cycle of the input horizontal synchronization signal corresponding thereto, and a length of the first internal line signal is less than the horizontal cycle of the internal horizontal synchronization signal corresponding thereto.

20. The image processing device according to claim 19, wherein the sequence of input line signals includes a second input line signal that contains second line image data and immediately follows the first input line signal, the internal line signals include a second internal line signal that contains the second line image data and immediately follows the first internal line signal, and a horizontal synchronization cycle of the internal horizontal synchronization signal corresponding to the second internal line signal is less than a horizontal synchronization cycle of the input horizontal synchronization signal corresponding to the second input line signal.

* * * * *